US008582458B2

(12) United States Patent
Robbins et al.

(10) Patent No.: US 8,582,458 B2
(45) Date of Patent: Nov. 12, 2013

(54) FEMTOCELL AUTOMATIC SPEED TEST

(75) Inventors: William Robbins, Sun Prairie, WI (US);
Judson Flynn, Decatur, GA (US);
William Gordon Mansfield, Sugar Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 456 days.

(21) Appl. No.: 12/893,831

(22) Filed: Sep. 29, 2010

(65) Prior Publication Data

US 2012/0076016 A1  Mar. 29, 2012

(51) Int. Cl.
*H04L 12/26* (2006.01)
(52) U.S. Cl.
USPC .......................................... 370/252; 370/241
(58) Field of Classification Search
USPC .............. 370/241, 241.1, 248–249, 250, 251, 370/252, 353
See application file for complete search history.

(56) References Cited

U.S. PATENT DOCUMENTS

| | | | | |
|---|---|---|---|---|
| 7,855,977 | B2 * | 12/2010 | Morrison et al. | 370/252 |
| 8,082,353 | B2 * | 12/2011 | Huber et al. | 709/229 |
| 2009/0042596 | A1 * | 2/2009 | Yavuz et al. | 455/522 |
| 2009/0135737 | A1 * | 5/2009 | Vikberg et al. | 370/254 |
| 2009/0280853 | A1 * | 11/2009 | Brisebois et al. | 455/522 |
| 2010/0029282 | A1 * | 2/2010 | Stamoulis et al. | 455/436 |
| 2010/0152869 | A1 * | 6/2010 | Morrison et al. | 700/96 |
| 2010/0240365 | A1 * | 9/2010 | Chen | 455/434 |
| 2010/0323679 | A1 * | 12/2010 | Yang | 455/418 |
| 2011/0010720 | A1 * | 1/2011 | Smith et al. | 718/102 |
| 2011/0151886 | A1 * | 6/2011 | Grayson et al. | 455/452.1 |
| 2012/0026865 | A1 * | 2/2012 | Fan et al. | 370/225 |
| 2012/0076018 | A1 * | 3/2012 | Singh et al. | 370/252 |
| 2012/0106370 | A1 * | 5/2012 | Radulescu et al. | 370/252 |
| 2012/0244794 | A1 * | 9/2012 | Brisebois et al. | 455/1 |
| 2012/0269082 | A1 * | 10/2012 | Morper et al. | 370/252 |
| 2013/0006780 | A1 * | 1/2013 | Raleigh | 705/14.73 |
| 2013/0028126 | A1 * | 1/2013 | Kazmi | 370/252 |

* cited by examiner

*Primary Examiner* — Kevin Mew
(74) *Attorney, Agent, or Firm* — Turocy & Watson, LLP

(57) ABSTRACT

A system and methodology that facilitates automatically determining performance parameters of a broadband network connected to a femto access point (FAP) is provided. In particular, the system automatically performs a broadband test, in the background, to detect the current speed, performance, throughput, etc. of the broadband network. The results of the speed test are then provided to the customer and/or to the femtocell carrier's Customer Care team, to facilitate diagnosing and correcting problems with the femtocell's performance. Specifically, the system notifies the customer of the broadband test results via short message service (SMS) message(s), email and/or posts the results on a femtocell management web page accessed by the customer. In addition, the femtocell automatic broadband test results can also be posted to an online tool that is accessed by authorized entities within the femtocell carrier's Customer Care team to facilitate easy and accurate diagnosis of femtocell performance issues.

20 Claims, 12 Drawing Sheets

FEMTOCELL AUTOMATIC SPEED TEST

TECHNICAL FIELD

The subject disclosure relates to wireless communications and, more particularly, to a mechanism that facilitates accurately diagnosing and correcting femtocell performance problems by performing an automatic broadband speed test.

BACKGROUND

Femtocells—building-based wireless access points interfaced with a wired broadband network—are traditionally deployed to improve indoor wireless coverage, and to offload a mobility radio access network (RAN) operated by a wireless service provider. Improved indoor coverage includes stronger signal and improved reception (e.g., voice, sound, or data), ease of session or call initiation, and session or call retention as well. Offloading a RAN reduces operational and transport costs for the service provider since a lesser number of end users utilizes over-the-air radio resources (e.g., radio frequency channels), which are typically limited. With the rapid increase in utilization of communications networks and/or devices, mobile data communications have been continually evolving due to increasing requirements of workforce mobility, and, services provided by femtocells can be extended beyond indoor coverage enhancement; for example, femtocells can be utilized in areas wherein macro coverage is not poor or weak.

Typically, the femtocell includes a femto access point (FAP) that connects to a broadband router, provides a strong wireless cell signal in a femtocell coverage area, and facilitates voice and/or data between a user equipment (UE) the mobile carrier's network via the broadband network. In particular, the broadband network provides access to the Internet by employing a digital subscriber line (DSL) or cable modem. If a femtocell is connected to a broadband service with an upload and/or download speed that is slower than minimum femtocell broadband speed requirements, the customer can experience problems, such as, inability to activate the femtocell, poor call quality, and/or dropped calls.

Majority of customers are unaware of their current broadband speed and typically have no idea if their femtocell performance problems are due to a slow broadband connection. This makes diagnosing and correcting femtocell performance problems caused by slow broadband speed very difficult. Inaccurate diagnostics and errors in correcting femtocell performance problems can lead to tedious troubleshooting and negatively impact customer satisfaction.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate determining whether minimum broadband speed requirements are met when installing a femtocell and/or at most any other time. Moreover, the system can perform a test to identify whether the femtocell is connected to a broadband service with an upload and/or download speed that is slower than minimum femtocell broadband speed requirements. In particular, a testing component can initiate and/or perform an automatic speed test, in the background, to determine current broadband network parameters, such as, but not limited to, speed, latency, performance throughput, speed, jitter, packet loss, noise, delay, etc. In addition, a results component is employed to provide the results of the test to the customer, such that the customer is aware of the current broadband performance. Further, the results component can also provide the results to a service provider's Customer Care team to facilitate easy and accurate diagnosis of broadband speed related femtocell performance issues.

Another aspect of the disclosed subject matter relates to a method that can be employed to facilitate automatically performing a test to determine the performance of a broadband network to which a femto access point (FAP) is connected. Moreover, the method comprises scheduling a broadband network test, for example, at startup, periodically, dynamically, on demand, at a specified time, based on an event, etc., and performing the broadband network test at the scheduled time. The broadband network test can include most any performance test(s) that can assess current performance conditions of the broadband network. As an example, a network performance test, a round trip time (RTT) ping test, and/or a network throughput test can be performed, and the test results can be collected and analyzed. Furthermore, the method comprises providing the test results (and/or analysis) to authorized entities (e.g., the femtocell owner, authorized femtocell users, authorized service provider employees, technical support, customer care, etc.). Accordingly, authorized entities are made aware of the broadband network conditions when attempting to diagnose a problem associated with femtocell performance.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
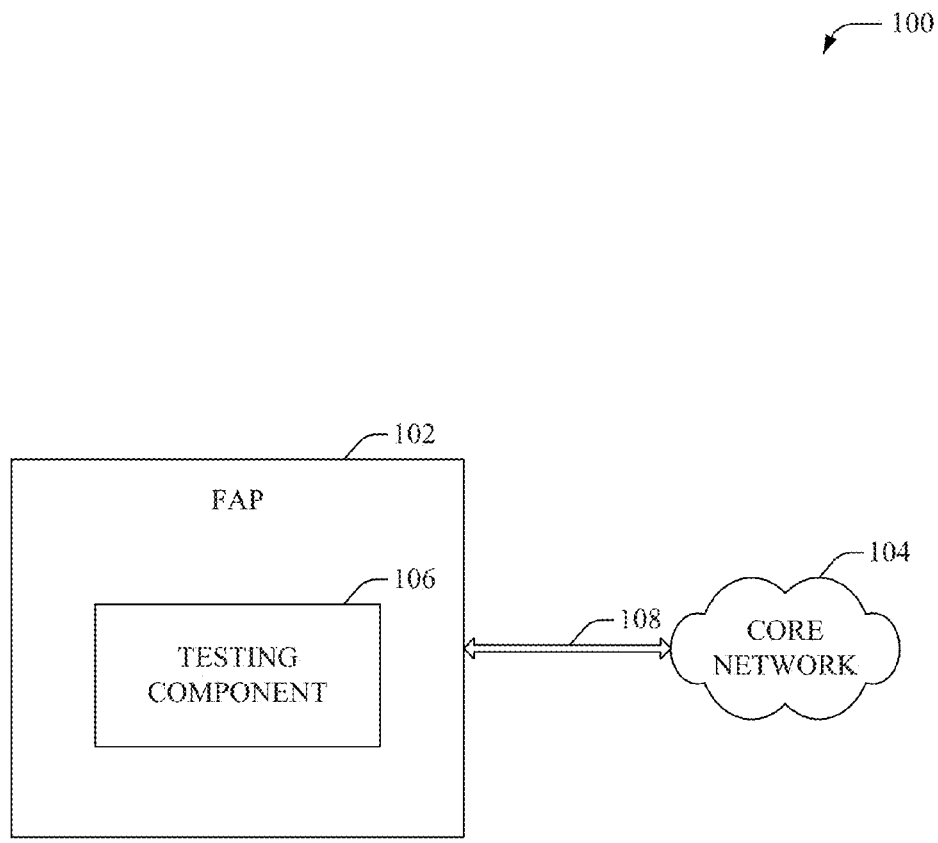
FIG. 1 illustrates an example system that facilitates determining speed of a broadband network connected to a femtocell.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms the terms "femtocell", and "femto" are utilized interchangeably, while "macro cell" and "macro" are utilized interchangeably herein.

A femtocell utilizes a broadband router to carry voice and/or data to the mobile carrier's core network via the broadband connection to the Internet. Typically, femtocells are provided with minimum femtocell broadband speed requirement, below which the customer can experience problems (e.g., inability to activate the femtocell, poor call quality and/or dropped calls). The systems and methods disclosed herein initiate an automatic femtocell speed test to test the speed, throughput and/or performance of the broadband network connected to the femtocell. Moreover, the results of the speed test are provided to the customer, and/or to a Customer Care team member, to facilitate accurately diagnosing and correcting problems with the femtocell's performance.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates determining speed of a broadband network connected to a femtocell, according to an aspect of the subject innovation. Typically, the system 100 includes a femtocell, served by a femto access point (FAP) 102. The femtocell can cover an area that can be determined, at least in part, by transmission power allocated to FAP 102, path loss, shadowing, and so forth. The femto access point 102 facilitates communication between authorized user equipment (UE) within a femtocell coverage area and a service provider's core network 104.

In particular, the communication (e.g., voice and/or data traffic) is routed through a backhaul broadband wired network 108. The broadband network can include an optical fiber backbone, twisted-pair line, T1/E1 phone line, DSL, coaxial cable, and/or the like. The FAP 102 can generally rely on the broadband network 108 for routing and paging, and for packet communication, substantially any quality of service can handle heterogeneous packetized traffic. Namely, packet flows established for UEs served by FAP 102, and for devices served through the broadband network 108. In one aspect, to ensure a positive subscriber experience, or perception, it is desirable for FAP 102 to maintain a high level of throughput for traffic (e.g., voice and/or data) utilized on a UE for one or more subscribers while in the presence of external, additional packetized, or broadband, traffic associated with applications (e.g., web browsing, data transfer (e.g., content upload), and the like) executed in UEs within the femtocell coverage area.

According to an embodiment, the FAP 102 can include a testing component 106 that can initiate an automatic speed test, in the background, to determine current parameters, such as, but not limited to, speed, throughput, performance etc. of the broadband network. Moreover, the testing component 106 can dynamically and/or automatically perform a broadband speed test in the background, for example, every time the FAP 102 is powered on, periodically, at a specified time, on demand, etc. In one aspect, the testing component 106 can initiate the speed test to a network element (e.g., a server in the core network 104) utilizing all of the broadband network 108 end-to-end to the femto network systems allowing for an end-to-end test. As an example, the testing component 106 can perform a round trip time (RTT) ping test by transmitting a ping signal to a network element in the core network 104 via the broadband network 108, and receiving a ping echo from the network element. Further, the testing component 106 can calculate the RTT and accordingly determine the latency of the broadband network 108.

In another example, the testing component 106 can transfer one or more files (e.g., of varying size or type) between the FAP 102 and the core network element over the broadband network 108, and measure differing size packets between elements to calculate an accurate throughput reading. In one aspect, the testing component 106 can test the broadband speed against multiple geographically dispersed servers (e.g., anywhere around the world). Further, the testing component 106 can calculate a download (the speed of data from the server to FAP 102) and upload (the speed of sending data from the FAP 102 to the server) bandwidth speeds. Additionally or optionally, the testing component 106 can also measure packet loss, ping, and/or jitter. Further, the testing component 106 can determine network throughput (e.g., average rate of successful message delivery over a communication channel) of the broadband network 108 based in part on the measurements. Typically, the throughput can be determined in bits per second (bit/s or bps), data packets per second, and/or data packets per time slot. In an example, network throughput (e.g., digital bandwidth consumption) can be analyzed mathematically by means of queuing theory, where the load in packets per time unit is denoted arrival rate X, and the throughput in packets per time unit is denoted departure rate u.

In yet another example, the testing component 106 can communicate with a website, for example, developed by service provider or by a third party, ping the website and receive results back from the website. Typically, the website can initiate download of a file from a web server and initiate an upload of a file from the FAP 102, and can calculate and uplink and downlink bandwidth speed based on the time taken for the upload and download respectively. In one aspect, the website can select a server that is geographically close to the location of the FAP 102. By choosing the shortest path between the FAP 102 and one of the web servers, auxiliary noise and/or other factors that could produce unreliable results can be decreased. After selection, the website can employ the broadband network 108 to send and/or receive packets of data to and from the web server. Further, the website (and/or the testing component 106) can determine the amount of data transferred within a specific time period. In accordance with an aspect, the results of the speed test obtained by any of the testing component 106 (e.g., by employing one or more of the above example tests) can be provided to the customer and/or and to the femtocell carrier's Customer Care team, to help in diagnosing and/or correcting problems associated with femtocell performance. Although illustrated as within the FAP 102, it can be appreciated that the testing component 106 can be externally connected to the FAP 102.

Figure 2:
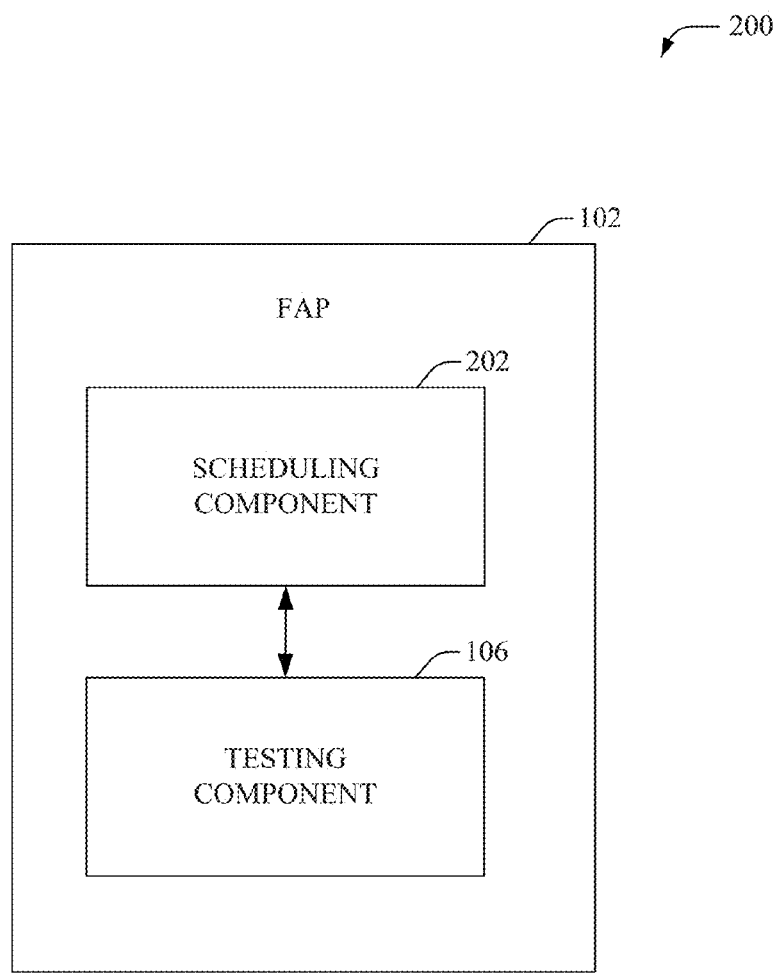
FIG. 2 illustrates an example system that can be employed for scheduling automated speed tests in a femtocell.

Referring to FIG. 2, there illustrated is an example system 200 that can be employed for scheduling automated speed tests in a femtocell in accordance with an aspect of the subject disclosure. Typically, a testing component 106 can reside within a FAP 102, and/or be operatively connected to the FAP 102. It can be appreciated that the FAP 102 and the testing component 106 can include functionality, as more fully described herein, for example, with regard to system 100. As discussed supra, the FAP 102 is connected to the mobile core network through a broadband network (108 in FIG. 1).

The speed of the broadband network can be affected by various factors. For example, during peak internet usage, the throughput from the broadband network can drop below minimum requirements due to load on the broadband provider's system. In another example, during initial setup, specific settings in a customer's home network can impact the throughput and prevent minimum broadband requirements. Further, impairments on the broadband line can also prevent minimum broadband requirements from being achieved. It can be appreciated that the above example are illustrative and most any factors can lead to slow broadband speed. The slow broadband speed can often, lead to femtocell performance problems. Typically, the broadband speed is not fast enough, and/or the users are running into contention on their broadband (e.g., other users downloading large files etc.) and the broadband does not provide a good end user experience.

In general, users are made aware of minimum broadband speed requirements by providing related information on websites and/or on product packaging/manuals etc. However, most users are unaware of their current broadband speed and do not identify the slow speed of their broadband as the problem why the femtocell is not working properly (e.g., poor call quality, dropped calls etc.) According to an aspect, the testing component 106 can perform a broadband speed test and provide the results of the test to the user and/or customer care representative. Thus, the user can explicitly be made aware of the current broadband speed and/or the customer care representative can easily and accurately diagnose and/or correct problems associated with the working of the femtocell. In one aspect, the FAP 102 can further include a scheduling component 202 that can determine when the speed test should be initiated. In one example, the scheduling component 202 can schedule the speed test on FAP 102 activation.

Moreover, each time the FAP 102 is powered up scheduling component 202 can trigger initiation of the speed test (e.g., by the testing component 106).

Further, the scheduling component 202 can also determine the number of speed tests to be performed and a time/date/day to perform the speed tests. The speed of the broadband network can vary based on several factors, such as, but not limited to, a time of day. Broadband network speeds can change during the day, so to achieve accurate test results the scheduling component 202 can schedule speed tests at different times of the day. Other factors that can provide an accurate speed test are the number of programs running and/or programs that the FAP 102 runs automatically at startup. Thus, in one example, the scheduling component 202 can also determine a time when the FAP 102 is not busy (or is idle) and schedule a speed test at that time.

Accordingly, the scheduling component 202 can facilitate scheduling speed tests on activation of the FAP 102, at a specific time, periodically (e.g., once every ten minutes, daily, monthly, etc.), on demand (e.g., by user and/or service provider), based on a predefined policy, based on an event, and/or most any other time. The testing component 106 can initiate and/or perform the speed test at the time scheduled by the scheduling component 202. For example, the testing component 106 can facilitate communicating a ping signal, data packets, files, etc., between the FAP 102 and one or more servers, via the broadband network, and obtaining and/or calculating test results.

Figure 3:
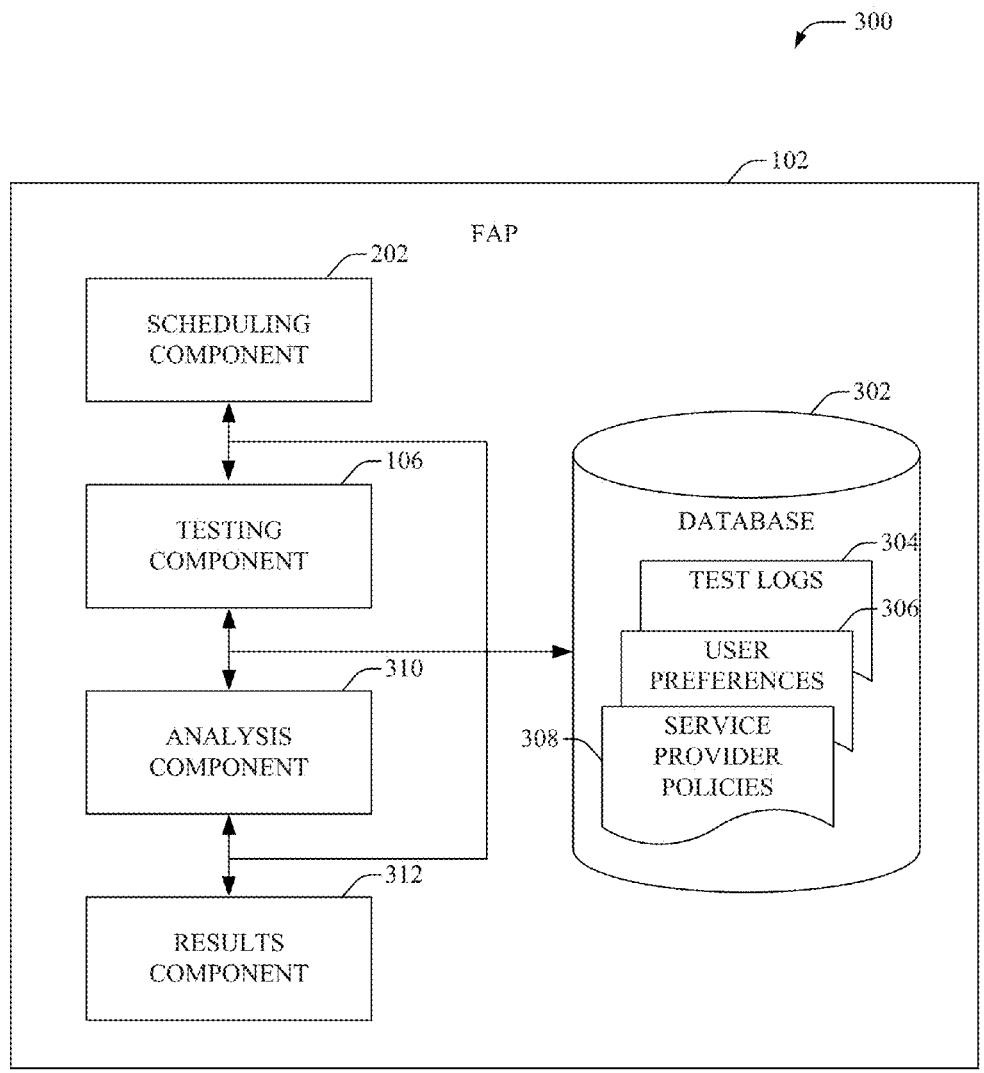
FIG. 3 illustrates an example system that can be employed to automatically and/or dynamically perform a test to identify the speed of a broadband network connected to a FAP.

Referring now to FIG. 3, there illustrated is an example system 300 that can be employed to automatically and/or dynamically perform a test to identify the speed of a broadband network connected to a FAP, according to an aspect of the subject disclosure. The FAP 102 delivers traffic from one or more UEs (not shown), connected to the FAP 102 to the core mobile network (e.g., 104) over a broadband link (e.g., 108). Customers can buy and setup a FAP 102 (e.g., in a home, office, store, etc.) to provide improved indoor wireless coverage and/or utilize femtocell services. However, when a customer buys a FAP 102, most often the customer is unaware of the broadband network, to which the FAP 102 can be connected. If the FAP 102 is connected to a broadband network with an upload and/or download speed that is slower than minimum femtocell broadband speed requirements, the customer can experience performance problems. Since the customer is unaware of broadband speeds, the customer typically has no idea that their femtocell performance problems are due to a slow broadband connection. System 300 determines a current broadband speed of the broadband network and provides this information to the user and/or customer care personnel. It can be appreciated that the FAP 102, the testing component 106, and scheduling component 202 can include functionality, as more fully described herein, for example, with regard to system 200.

According to an aspect, the FAP 102 can include a database 302. The database 302 can store information, such as, but not limited to, test logs 304, user preferences 306, service provider policies 308, etc. Moreover, the user preferences 306 can be defined by a user, for example, a FAP owner. In one aspect, the user can define user preferences 306 during an initial setup phase. However, it can be appreciated that the user preferences 306 can be updated and/or defined at most any time. Further, the service provider policies 308 can be specified by a service provider during provisioning, and/or updated periodically and/or on demand, by the service provider. It can be appreciated that the database 302 can be most any type of database, and, can be local to the FAP 102, remotely connected to the FAP 102, or distributed. As an example, the scheduling component 202 can utilize information stored in the database 302 to identify a time to schedule a broadband speed test. Further, the testing component 106 can automatically perform the broadband speed test in the background, at the scheduled time and can store information associated with the speed test, for example, the test results, time of test, etc. in the test logs 304.

Furthermore, an analysis component 310 can utilize information from the database 302 and/or testing component 106 to perform an analysis. In particular, the database 302 can store most any information that can enable the analysis component 310 identify and/or diagnose problems with the FAP 102 performance. According to one embodiment, database 302 can store minimum speed requirements (not shown) for the broadband network. For example, minimum speed requirements can define a threshold uplink and/or downlink rate/speed (e.g., in kbps), below which the performance of the FAP 102 would be unsatisfactory (e.g., poor call quality, slow downloads, and/or dropped calls) to the customer. Further, the analysis component 310 can compare the test results (e.g., from the testing component 106) with the minimum speed requirements to identify whether the current broadband speed is below the minimum speed requirements. In addition, the analysis component 310 can also compute average speed based on data from multiple test results and/or generate most any statistical data.

The FAP 102 can further include a results component 312 that can be employed to provide results of the speed tests or the analysis to one or more authorized users and/or to the femtocell carrier's Customer Care team, to help in diagnosing and correcting performance problems associated with the femtocell. In one example, the results component 312 provides alerts only in the case wherein the speed of the broadband network is lower than the threshold. Moreover, where the speed of the broadband network is found to be inadequate (e.g., lower than the threshold) and the broadband network is provided by the same service provider that provides the Femtocell, the results component 312 can provide the user an option to upgrade broadband service. In another example, the analysis component 310 can employ the broadband test results to calculate an appropriate buffer for the broadband modem and dynamically alter the broadband service to improve femtocell service and/or prioritize the femtocell traffic on the broadband service.

It can be appreciated that the database 302 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 4:
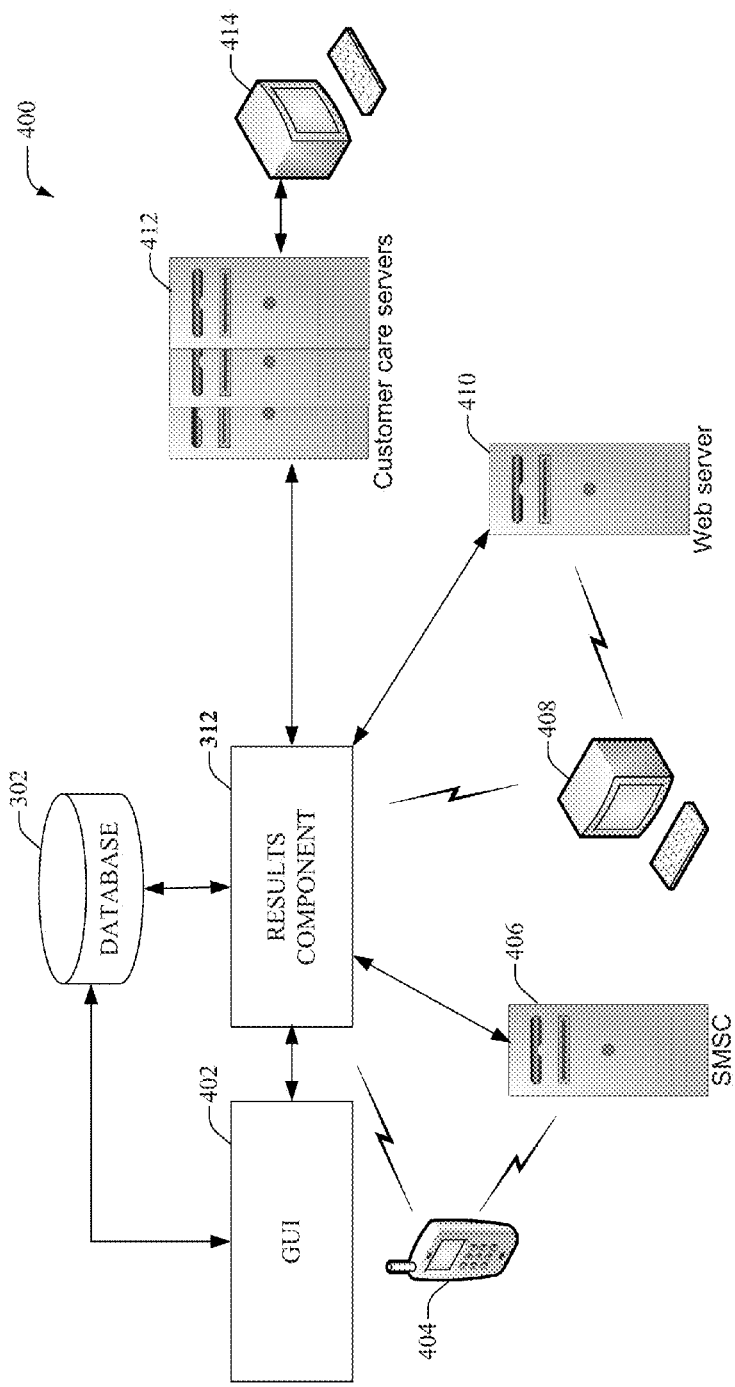
FIG. 4 illustrates an example system that provides results of a femtocell automatic speed test to one or more authorized entities.

FIG. 4 illustrates an example system 400 that provides results of a femtocell automatic speed test to one or more authorized entities, according to an aspect of the subject innovation. The speed, performance, throughput, etc., of the broadband network connected to the FAP can be calculated at various times, such as, but not limited to, on startup of the FAP, periodically, on demand, etc. According to an aspect, the user (e.g., owner of the femtocell and/or authorized users) and/or customer care personnel can be notified of the results of the broadband test. It can be appreciated that the database 302 and results component 312 can be located within the FAP and/or can be externally connected to the FAP. Moreover, the database 302 and results component 312 can include functionality, as more fully described herein, for example, with regard to system 300.

The results component 312 can provide information associated with the tests (e.g., performed by the testing component 106) in various formats to one or more devices. Data associated with result format and/or display can be stored as user and/or service provider preferences and/or policies (e.g., 306, 308, etc.) within the database 302. Moreover, default formats and/or display methods can also be employed by the results component 312. In one aspect, the results component 312 can be configured to provide alerts and/or warnings, only if the broadband speed/performance/throughput is below a specified threshold value. In another aspect, the results component 312 can be configured to provide the tests results, each time the test is performed. In yet another aspect, the results component 312 can aggregate test results from multiple tests and transfer the results to various devices at a specific time, for example, when femtocell is idle, periodically, on demand (e.g., polling), etc. In one example, wherein the broadband network is provided by the same service provider that provides the Femtocell, the results component 312 can provide the user with an option to upgrade broadband service, for example, if the results of the broadband network test are found to be inadequate (e.g., lower than a threshold). Additionally or alternately, buffer lengths for the broadband modem (e.g., within the FAP 102) can be computed by employing the broadband test results and/or the broadband service can be automatically/dynamically updated to improve femtocell service and/or prioritize the femtocell traffic on the broadband service.

According to one embodiment, the results component 312 can display results of the broadband test on a graphical user interface (GUI) 402 on the FAP. The customer can employ the GUI to set user preferences (e.g., 306) in the database 302 to specify when to provide results, what to provide and to which devices to provide results. In one example, the results component 312 can provide the broadband test results to a UE 404 (e.g., cellular phone, laptop, desktop, personal digital assistant, etc.) via a Short Message Service (SMS) message. Typically, the results component 312 can transmit (e.g., over the broadband network) the results to an SMS Center (SMSC) 406 in the core network, which can forward the results to the UE 404 in an SMS, over the macro network. Additionally or alternately, to save SMS delivery costs, the results component 312 can identify when the UE (404, 408) is within the femtocell coverage area, and transmit the results directly to the UE (404, 408) over the femto network. Similarly, the results component 312 can also provide the broadband test results to a customer UE (404, 408) via email.

Further, the results component 312 can store the test results within a web server 410. For example, the web server 410 can host the femtocell carrier's femtocell management web page. Typically, the customer can log in to this web page with their account credentials, for example, via UE 408/404 and manage various functions of the femtocell. The webpage can also provide the results of the last automatic broadband test and/or provide a log of all broadband tests performed by the FAP. As an example, comparison data for other customers of the same company, within a particular region, and/or minimum requirements for the broadband network can also be provided.

In addition, the results component 312 can deliver the femtocell automatic broadband test results to a set of core network servers 412 accessed by a network operator and/or authorized Customer Care representatives, via UE 414. In one example, the broadband test results can also be polled by the core network servers 412, for example, periodically and/or on demand. According to an aspect, a Customer Care representative can employ UE 414 to access the core network servers 412 directly or remotely over a network (e.g., the Internet) to retrieve test data associated with a customer. In one example, if the broadband speed/performance/throughput associated with a customer is below a specified threshold value, an audio/visual alert or warning can be presented on UE 414. Typically, the Customer Care representative can employ an online tool to review the results of the most recent speed test (and/or logs from previous speed tests) while discussing femtocell performance issues with the customer (e.g., if customer calls the customer care representative to report a performance issue with the femtocell).

Figure 5:
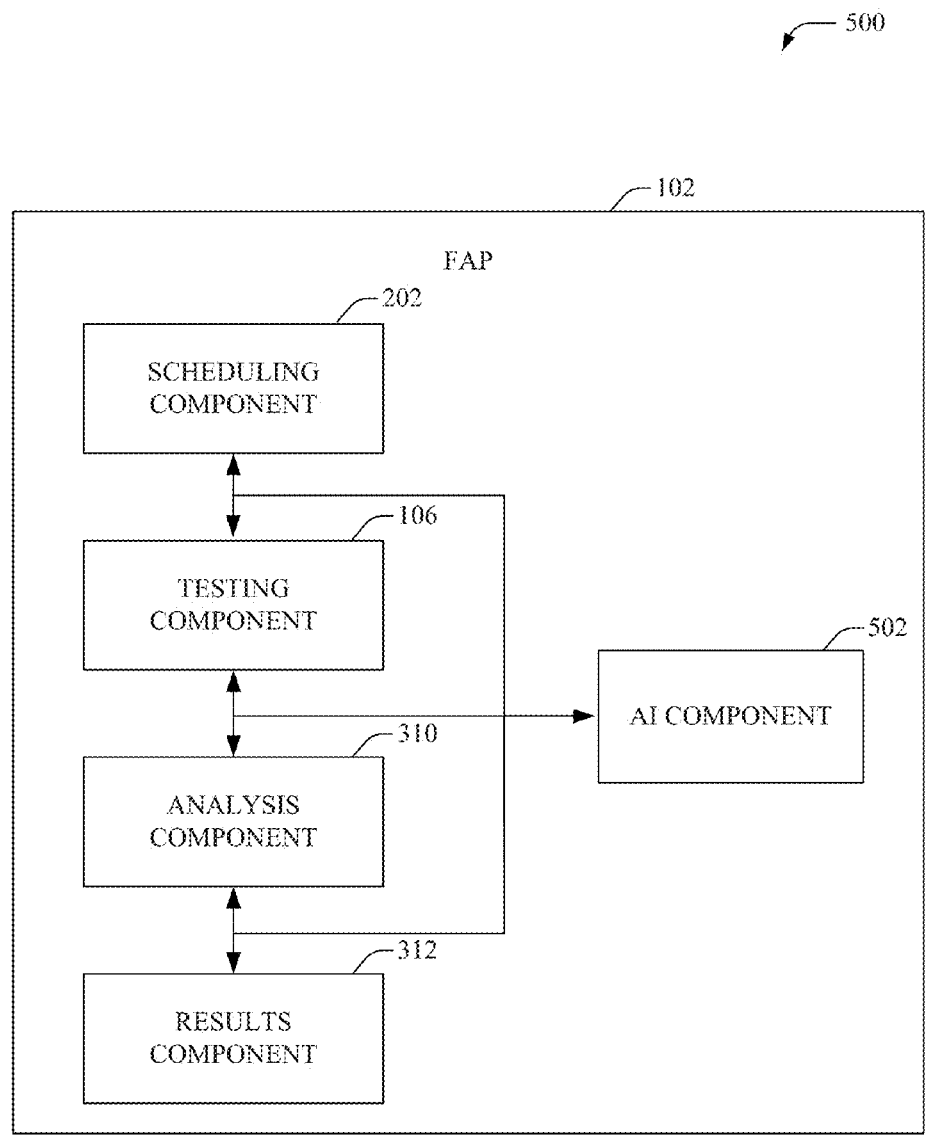
FIG. 5 illustrates an example system that facilitates automating one or more features in accordance with the subject innovation.

FIG. 5 illustrates an example system 500 that employs an artificial intelligence (AI) component 502, which facilitates automating one or more features in accordance with the subject innovation. It can be appreciated that the FAP 102, scheduling component 202, testing component 106, analysis component 310, and results component 312 can include respective functionality, as more fully described herein, for example, with regard to systems 100, 200, 300 and 400.

The subject innovation (e.g., in connection with automatically initiating a broadband test and/or providing test results) can employ various AI-based schemes for carrying out various aspects thereof For example, a process for determining when or how to test the speed, performance, throughput, etc., of the broadband network connected to the FAP 102 can be facilitated via an automatic classifier system and process. Moreover, the classifier can be employed to determine when the broadband test can be initiated, how the test can be performed, how and to whom, the results can be provided, etc.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information stored in database 302, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when the femtocell is likely to have performance issues due to problems in the broadband network, when the broadband test can be initiated, how the test can be performed, how many times is the test performed, which servers to utilize to perform an end-to-end test, when the femtocell is likely to be underutilized and/or idle, which user to send the results, what type of results to transmit, when to transmit results, etc. The criteria can include, but is not limited to, historical patterns, UE behavior, user preferences, service provider preferences and/or policies, FAP parameters, location of the UE, motion of the UE, location of the femtocell, etc.

Figure 6:
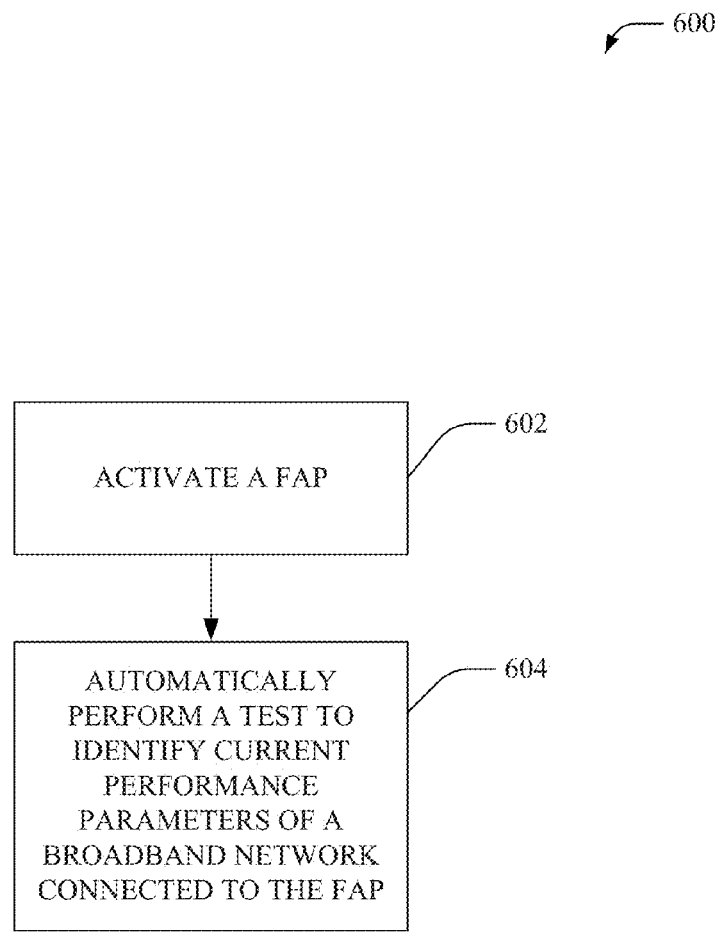
FIG. 6 illustrates an example methodology that can be utilized to facilitate detection of current performance of a broadband network connected to a FAP.
Figure 7:
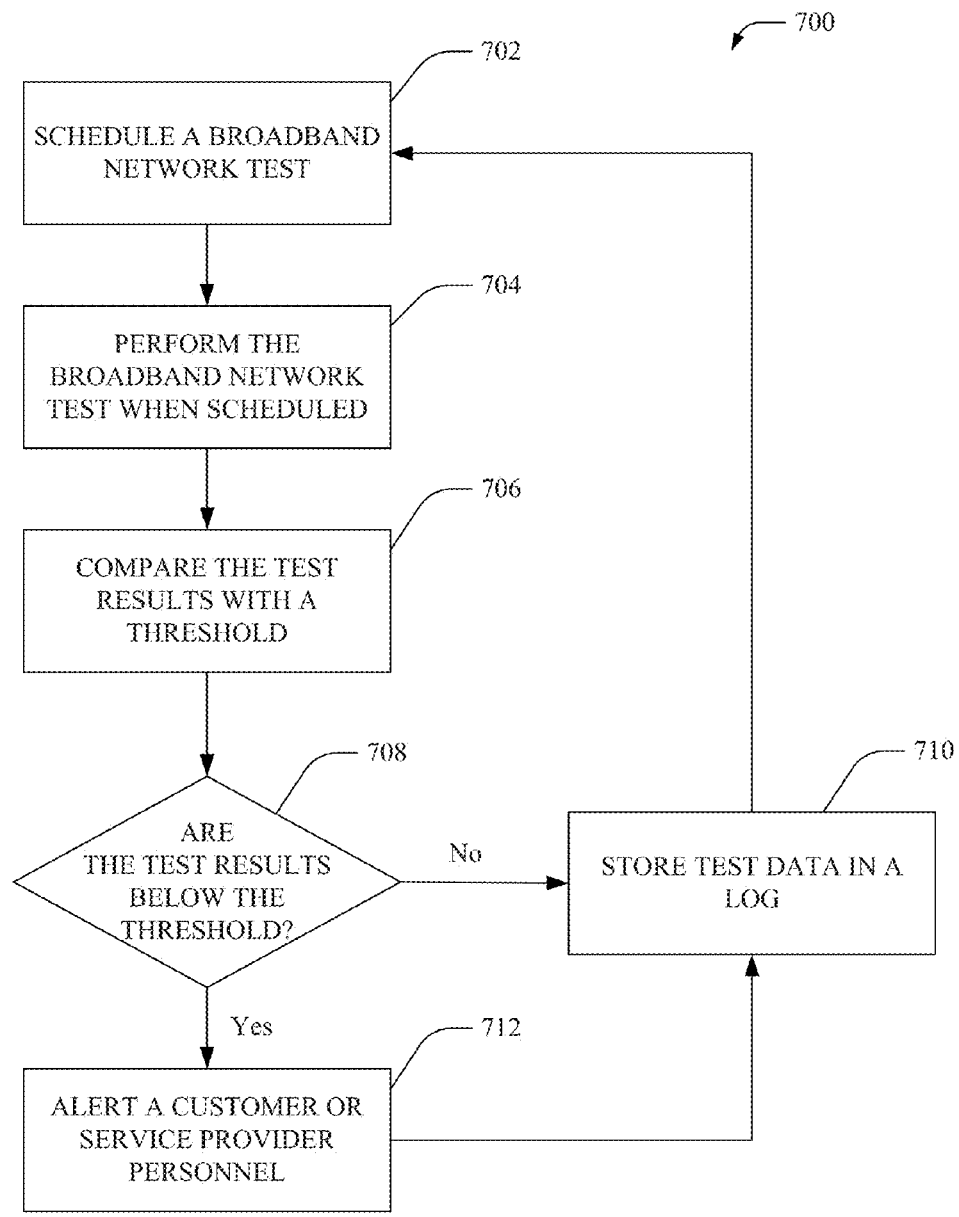
FIG. 7 illustrates an example methodology that facilitates a femtocell automatic speed test in accordance with an aspect of the subject specification.
Figure 8:
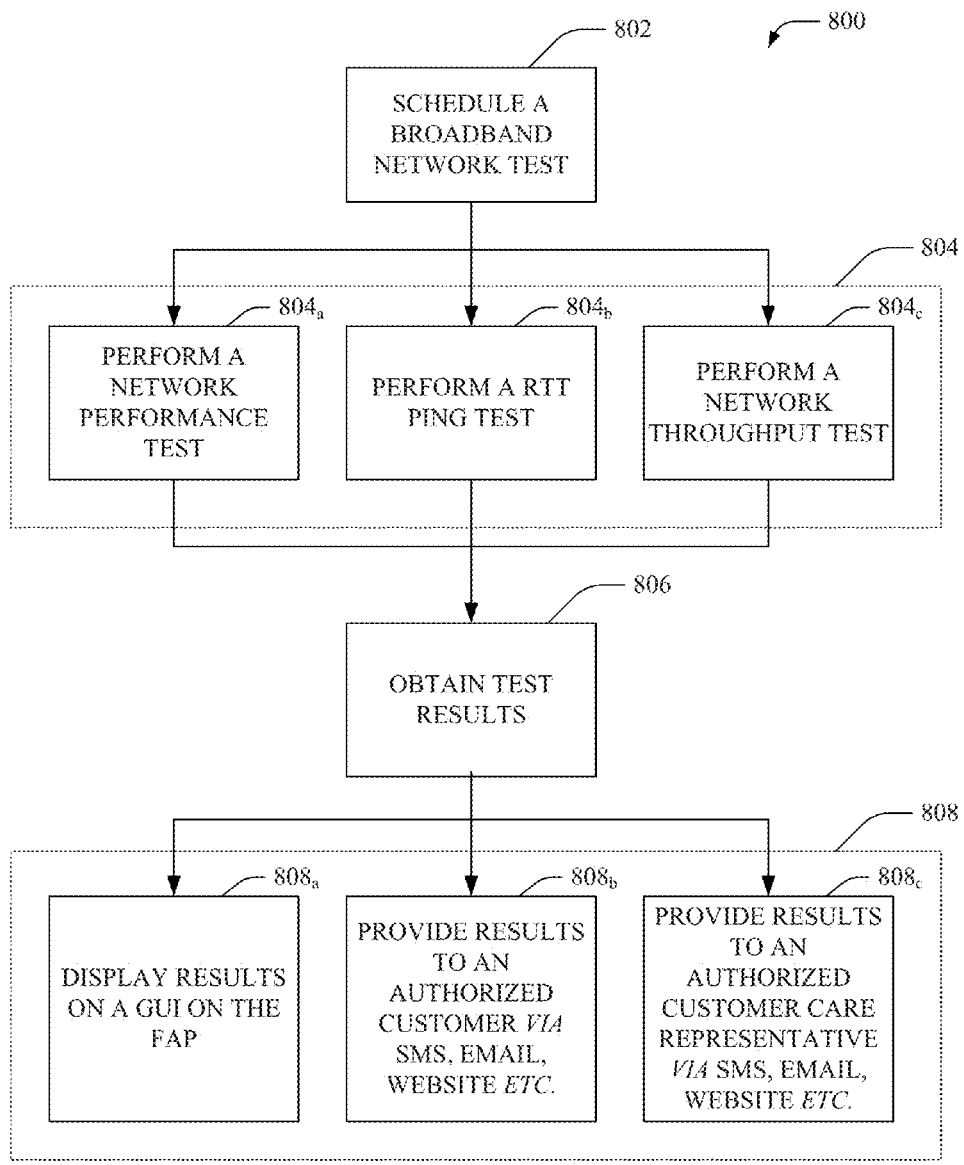
FIG. 8 illustrates an example methodology that facilitates providing results of an automatic broadband network test to authorized entities.

FIGS. 6-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 6, illustrated is an example methodology 600 that can be utilized to facilitate detection of current performance of a broadband network connected to a FAP, according to an aspect of the subject specification. If a femtocell is connected to a broadband network that is slower than minimum femtocell broadband speed requirements, the user can experience femtocell performance problems. Most often, users in this situation have no idea that the degraded femtocell performance is caused by the slow broadband network. Methodology 600 facilitates easily diagnosing and correcting femtocell performance problems caused due to slow broadband speed.

At 602, the FAP can be activated. Typically, activation can occur when the FAP is powered on (e.g., when power goes out, at setup, when rebooted, etc.). Moreover, an automatic speed test can be initiated when the device goes through an activation/startup process. At 604, a test to identify current performance parameters of the broadband network connected to the FAP can be automatically performed. The performance parameters can include, but are not limited to, latency, performance throughput, speed, jitter, packet loss, noise, delay, etc. Various types of tests can be performed to identify the current performance parameters. In one aspect, a speed test to a core network element can be performed utilizing the end-to-end broadband network. For example, a RTT ping test can be performed to validate latency, or a file/data packet can be transferred between the FAP and network element to validate throughput.

FIG. 7 illustrates an example methodology 700 that facilitates a femtocell automatic speed test in accordance with an aspect of the subject specification. In particular, methodology 700 provides a mechanism to trigger one or more tests that determine performance parameters, such as, but not limited to, latency, performance, throughput, speed, jitter, packet loss, noise, delay, etc. of a broadband network employed by a femtocell to backhaul traffic to the core network.

At 702, a broadband network test can be scheduled. For example, the broadband network test can be scheduled at startup, periodically, dynamically, on demand, at a specified time, based on an event, etc. Further, at 704, the broadband network test can be performed when scheduled. As an example, most any automatic end-to-end network test can be performed in the background to determine current parameters, such as, but not limited to, speed, throughput, performance, jitter, delay, noise, etc. Furthermore, at 706, the test results can be compared to a threshold. For example, the threshold can be indicative of minimum broadband network requirements to avoid performance issues at the femtocell.

In one aspect, at 708, it can be determined whether test results are below the threshold. If the test results are not below the threshold, then at 710, the test data can be stored in a log. Alternately, if the test results are below the threshold, then at 712, a customer and/or service provider personnel (e.g., customer care representative) can be alerted.

FIG. 8 illustrates an example methodology 800 that facilitates providing results of an automatic broadband network test to authorized entities, according to an aspect of the subject disclosure. Oftentimes, users are unaware of the speed of the broadband network, to which they connect a FAP. In addition, during peak internet usage, the throughput from the broadband network can drop below minimum requirements due to load on the broadband providers system. Further, during initial setup, the user can define settings in their home network, which can impact the throughput in the broadband network and prevent minimum requirements. Furthermore, impairments can exist on the broadband line, which prevent minimum requirements from being achieved. Methodology 800 identifies the current performance parameters of the broadband network and provides them to the appropriate entities to facilitate easy and accurate diagnosis of femtocell performance issues.

At 802, a broadband network test can be scheduled (e.g., at startup, periodically, dynamically, on demand, at a specified time, based on an event, etc.). At 804, the broadband network test can be performed. For example, at $804_a$, a network performance test can be performed, at $804_b$ a RTT ping test can be performed, and/or at $804_c$, a network throughput test can be performed, for example, by the FAP or by a service provider/third party website. Further, at 806, the test results can be obtained. In one example, the test results from more than one test can be aggregated (e.g., averaged). Additionally or optionally, the test results can be analyzed to identify whether the minimum broadband performance requirements are met.

Furthermore, at 808, the test results (and/or analysis) are provided to authorized entities. For example, at $808_a$, the test results can be displayed (e.g., audio and/or visual alert) on a GUI of the FAP. Thus, on activation, the user can be notified via the GUI, if the minimum broadband performance requirements are not met. In another example, at $808_b$, the test results can be provided to an authorized customer (e.g., femtocell owner, authorized user, etc.), for example, via SMS message(s) to the authorized customer's mobile device, via email to the authorized customer's email address and/or via a service provider's femtocell management web page. As an example, the authorized customer can log in to the femtocell management web page with account credentials and manage various functions of their femtocell, including, view the results of automatic broadband speed test(s) performed on the broadband network connected to their FAP. In yet another example, at 808$_c$, the test results can be provided to authorized customer care representatives (e.g., technical support personnel) for example, via SMS message(s) to the authorized representatives' mobile device, via email to the authorized representatives' email address and/or via an online tool, to which the authorized representatives' have access, so they can review the results of the automatic broadband speed test(s) if the user reports a femtocell performance issue.

Figure 9:
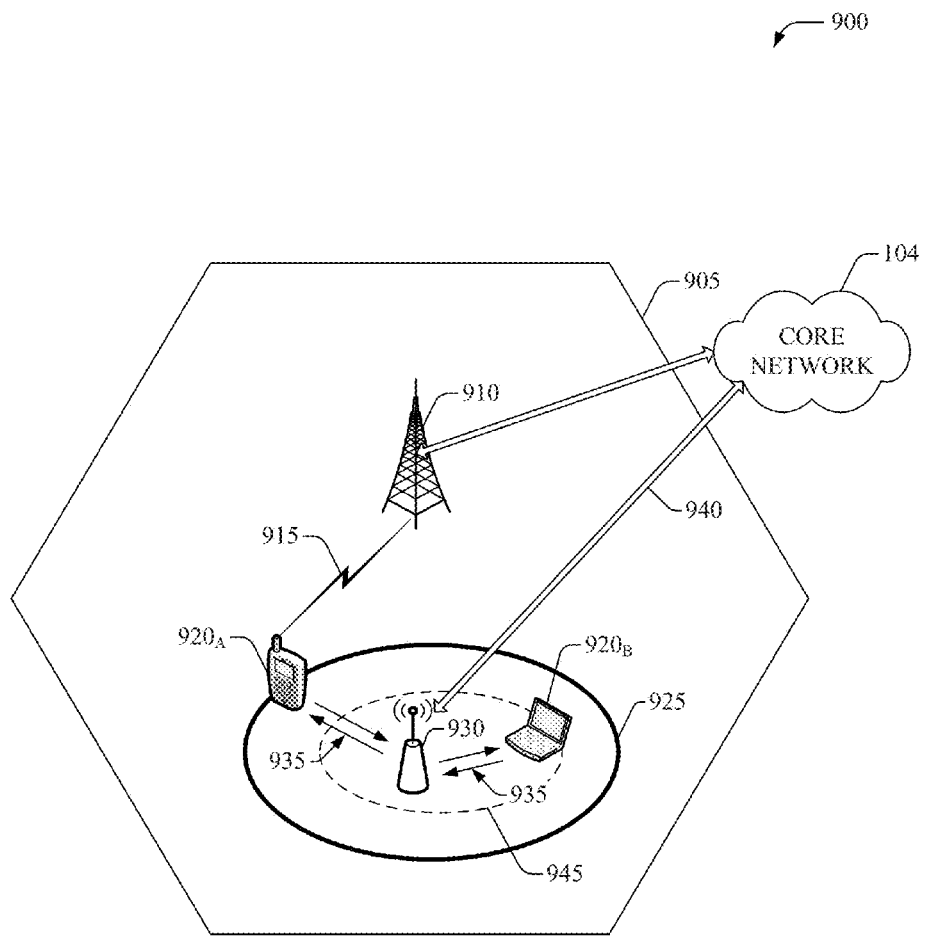
FIG. 9 illustrates an example wireless communication environment with associated components for operation of a femtocell in accordance with the subject specification.

FIG. 9 illustrates a schematic wireless environment 900 (e.g., a network) in which a femtocell can exploit various aspects of the subject innovation in accordance with the disclosed subject matter. In wireless environment 900, area 905 can represent a coverage macro cell, which can be served by base station 910. Macro coverage is generally intended for outdoors locations for servicing mobile wireless devices, like UE 920$_A$, and such coverage is achieved via a wireless link 915. In an aspect, UE 920 can be a 3GPP Universal Mobile Telecommunication System (UMTS) mobile phone.

Within macro coverage cell 905, a femtocell 945, served by a femto access point 930, can be deployed. A femtocell typically can cover an area 925 that is determined, at least in part, by transmission power allocated to FAP 930, path loss, shadowing, and so forth. Coverage area typically can be spanned by a coverage radius that ranges from 20 to 50 meters. Confined coverage area 945 is generally associated with an indoors area, or a building, which can span about 5000 sq. ft. Generally, FAP 930 typically can service a number (e.g., a few or more) wireless devices (e.g., subscriber station 920$_B$) within confined coverage area 945. In an aspect, FAP 930 can integrate seamlessly with substantially any PS-based and CS-based network; for instance, FAP 930 can integrate into an existing 3GPP Core via conventional interfaces like Iu-CS, Iu-PS, Gi, Gn. In another aspect, FAP 930 can exploit high-speed downlink packet access in order to accomplish substantive bitrates. In yet another aspect, FAP 930 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE 920$_A$, can leave macro coverage (e.g., cell 905) and enters femtocell coverage (e.g., area 915), as illustrated in environment 900. A carrier frequency scan can be triggered by the UE 920$_A$, which can detect the FAP 930. UE 920$_A$ can attempt to attach to the FAP 930 through transmission and reception of attachment signaling, effected via a FL/RL 935; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 920 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 930) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 920 generally can be commanded (through a variety of communication means) to select another LAC/RAC or enter "emergency calls only" mode. It is to be appreciated that this attempt and handling process can occupy significant UE battery, and FAP capacity and signaling resources as well.

When an attachment attempt is successful, UE 920 can be allowed on femtocell 925 and incoming voice and data traffic can be paged and routed to the subscriber station through the FAP 930. It is to be noted also that data traffic is typically routed through a backhaul broadband wired network backbone 940 (e.g., optical fiber backbone, twisted-pair line, T1/E1 phone line, DSL, or coaxial cable). It is to be noted that as a FAP 930 generally can rely on a backhaul network backbone 940 for routing and paging, and for packet communication, substantially any quality of service can handle heterogeneous packetized traffic. Namely, packet flows established for wireless communication devices (e.g., terminals 920$_A$ and 920$_B$) served by FAP 930, and for devices served through the backhaul network pipe 940. It is to be noted that to ensure a positive subscriber experience, or perception, it is desirable for FAP 930 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femtocell coverage area (e.g., area 925 or area 945). Accordingly, the FAP 930 can trigger and/or perform automatic broadband seep test(s), in the background, to measure current broadband conditions, such as, but not limited to, latency, performance, throughput, packet loss, noise, jitter, delay, etc., and determine whether minimum broadband network requirements are met.

Figure 10:
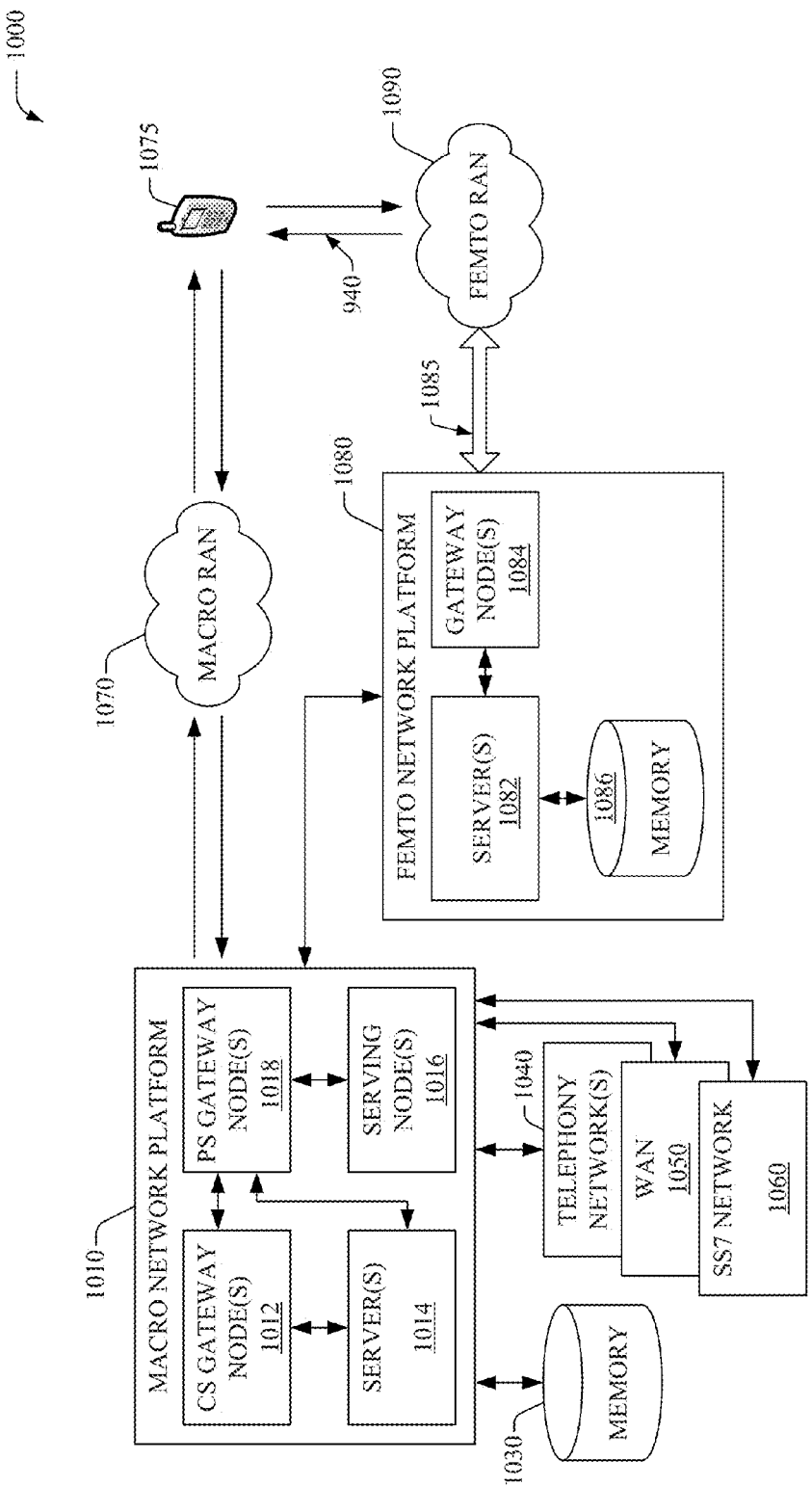
FIG. 10 illustrates a schematic deployment of a macro cell and a femtocell for wireless coverage in accordance with aspects of the disclosure.
Figure 11:
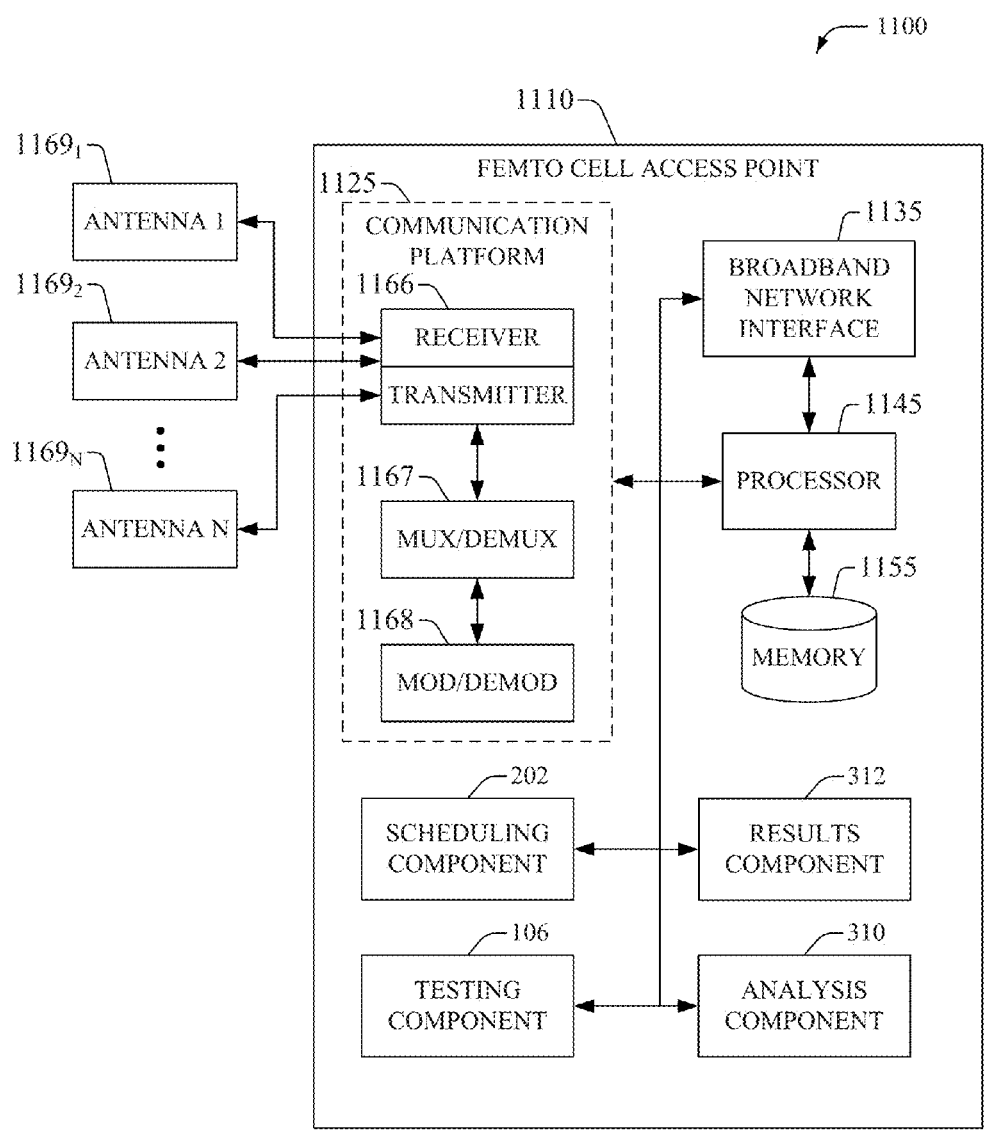
FIG. 11 illustrates an example embodiment of a femto access point that can facilitate a femtocell automatic speed test, according to the subject disclosure.

To provide further context for various aspects of the subject specification, FIGS. 10 and 11 illustrate, respectively, an example wireless communication environment 1000, with associated components for operation of a femtocell, and a block diagram of an example embodiment 1100 of a femto access point, which can facilitate automatic speed test(s) in accordance with aspects described herein.

Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090 linked to the femto network platform 1080 via backhaul pipe(s) 1085, wherein backhaul pipe(s) are substantially the same a backhaul link 940. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 905, while femto RAN 1090 can comprise multiple femtocell access points. As mentioned above, it is to be appreciated that deployment density in femto RAN 1090 is substantially higher than in macro RAN 1070.

Generally, both macro and femto network platforms 1010 and 1080 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Moreover, CS gateway node(s) 1012 interfaces CS-based traffic and signaling and gateway node(s) 1018.

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. It should be further appreciated that the packetized communication can include multiple flows that can be generated through server(s) 1014. Macro network platform 1010 also includes serving node(s) 1016 that convey the various packetized flows of information, or data streams, received through gateway node(s) 1018. It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Server(s) 1082 have substantially the same functionality as described in connection with server(s) 1014 and can include one or more processor configured to confer at least in part the functionality of macro network platform 1010. Moreover, the automatic broadband network test(s) can be performed with server(s) 1082 and/or server(s) 1014. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femtocell configuration (e.g., devices served through femto RAN 1090; access control lists, or white lists); service policies and specifications; privacy policies; add-on features; and so forth With respect to FIG. 11, in example embodiment 1100, femtocell AP 1110 can receive and transmit signal(s) (e.g., traffic and control signals) from and to wireless devices, access terminals, wireless ports and routers, etc., through a set of antennas $1169_1$-$1169_N$. It should be appreciated that while antennas $1169_1$-$1169_N$ are a part of communication platform 1125, which comprises electronic components and associated circuitry that provides for processing and manipulating of received signal(s) (e.g., a packet flow) and signal(s) (e.g., a broadcast control channel) to be transmitted. In an aspect, communication platform 1125 includes a transmitter/receiver (e.g., a transceiver) 1166 that can convert signal(s) from analog format to digital format upon reception, and from digital format to analog format upon transmission. In addition, receiver/transmitter 1166 can divide a single data stream into multiple, parallel data streams, or perform the reciprocal operation. Coupled to transceiver 1166 is a multiplexer/demultiplexer 1167 that facilitates manipulation of signal in time and frequency space. Electronic component 1167 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1167 can scramble and spread information (e.g., codes) according to substantially any code known in the art; e.g., Hadamard-Walsh codes, Baker codes, Kasami codes, polyphase codes, and so on. A modulator/demodulator 1168 is also a part of operational group 1125, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1110 also includes a processor 1145 configured to confer functionality, at least partially, to substantially any electronic component in the femto access point 1110, in accordance with aspects of the subject innovation. In particular, processor 1145 can facilitate FAP 1110 to implement configuration instructions received through communication platform 1125, which can include storing data in memory 1155. In addition, processor 1145 facilitates FAP 1110 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1145 can manipulate antennas $1169_1$-$1169_N$ to facilitate beamforming or selective radiation pattern formation, which can benefit specific locations (e.g., basement, home office . . . ) covered by FAP; and exploit substantially any other advantages associated with smart-antenna technology. Memory 1155 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1155 can store configuration information such as schedules and policies; FAP address(es) or geographical indicator(s); access lists (e.g., white lists); license(s) for utilization of add-features for FAP 1110, and so forth.

In embodiment 1100, processor 1145 is coupled to the memory 1155 in order to store and retrieve information necessary to operate and/or confer functionality to communication platform 1125, broadband network interface 1135 (e.g., a broadband modem), and other operational components (e.g., multimode chipset(s), power supply sources . . . ; not shown) that support femto access point 1110. The FAP 1110 can further include a testing component 106, scheduling component 202, analysis component 310 and results component 312, which can include functionality, as more fully described herein, for example, with regard to systems 100-500. In addition, it is to be noted that the various aspects disclosed in the subject specification can also be implemented through (i) program modules stored in a computer-readable storage medium or memory (e.g., memory 1086 or memory 1155) and executed by a processor (e.g., processor 1145), or (ii) other combination(s) of hardware and software, or hardware and firmware.

Figure 12:
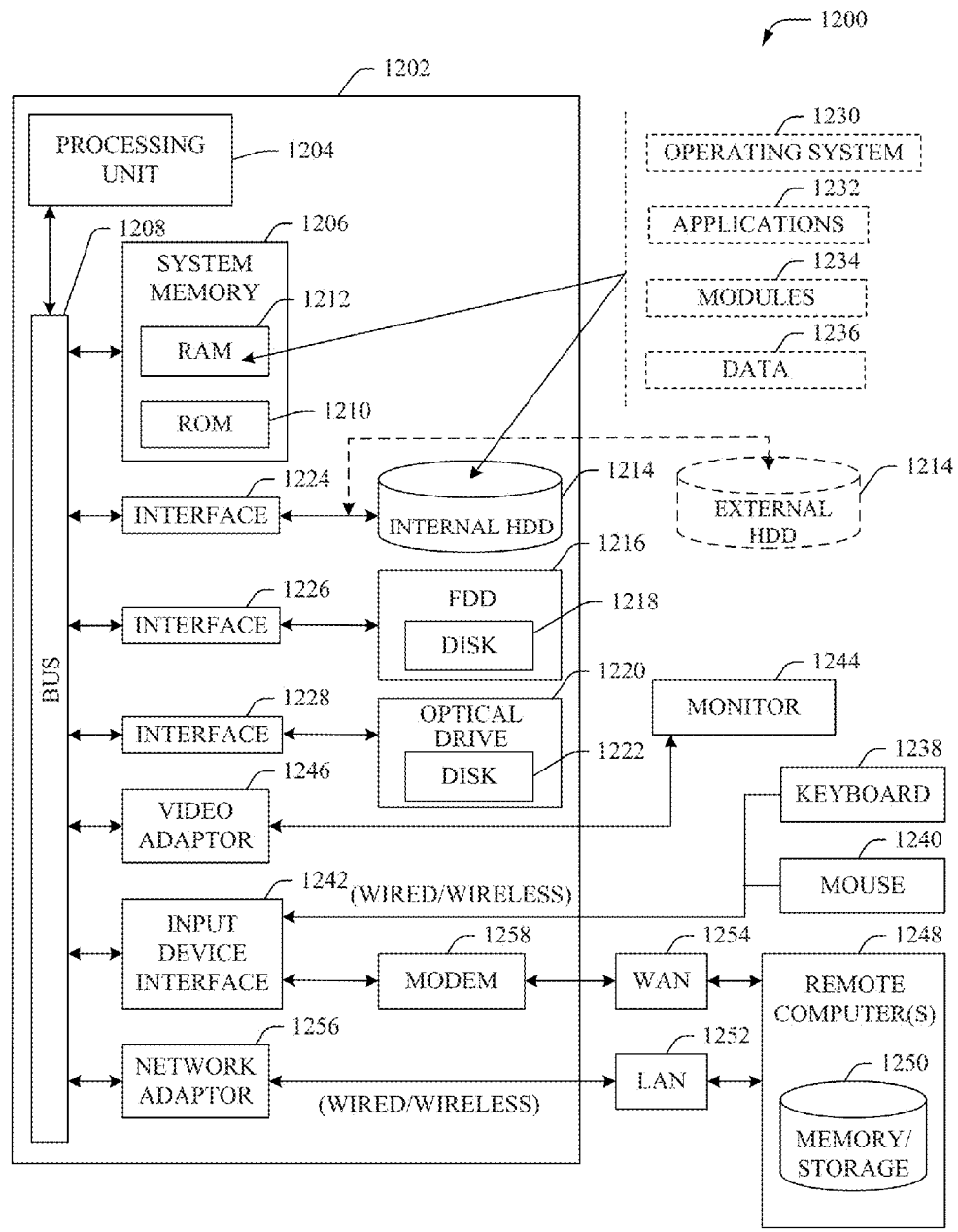
FIG. 12 illustrates a block diagram of a computer operable to execute the disclosed communication architecture.

Referring now to FIG. 12, there is illustrated a block diagram of a computer operable to execute the disclosed communication architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory to store instructions; and
    a processor, coupled to the memory, that facilitates execution of the instructions to perform operations, comprising:
        performing a test to determine performance parameter data indicative of a performance parameter associated with a transmission link of a broadband network coupled to a femto access point device, wherein the performing comprises communicating with a network device to facilitate a transfer of file data between the network device and the femto access point device and receiving, from the network device, information indicative of a speed of the broadband network based on the transfer, wherein the performance parameter data is determined based on the information, and
        facilitating a transmission of the performance parameter data to an authorized communication device.

2. The system of claim 1, wherein the performance parameter data further comprises noise data indicative of a, noise associated with the transmission link.

3. The system of claim 1, wherein the operations further comprise:
    performing a round trip time ping test based on directing a ping signal to a device of a mobility network via the broadband network to facilitate determination of the performance parameter data.

4. The system of claim 1, wherein the file data is first file data, the transfer is a first transfer, and the operations further comprise:
    facilitating a second transfer of second file data between the femto access point device and a device of a mobility over the broadband network to determine throughput data indicative of a throughput of the broadband network, wherein the performance parameter data is further determined based on the throughput data.

5. The system of claim 1, wherein the transfer comprises an upload of the file data from the femto access point device to the network device and the information is indicative of an upload speed of the broadband network.

6. The system of claim 1, wherein the transfer comprises a download of the file data from the network device to the femto access point device and the information is indicative of a download speed of the broadband network.

7. The system of claim 1, wherein the operations further comprise:
    scheduling the test in response to the femto access point device being powered on.

8. The system of claim 1, wherein the facilitating the transmission comprises facilitating the transmission in response to determining that the performance parameter data does not satisfy a defined performance criterion.

9. The system of claim 1, wherein the operations further comprise:
    facilitating a presentation of result data indicative of a result of the test via on a graphical interface of the femto access point device.

10. The system of claim 1, wherein the facilitating the transmission comprises facilitating the transmission via a text message.

11. The system of claim 1, wherein the facilitating the transmission comprises facilitating the transmission via a femtocell management web server device.

12. A method, comprising:
    communicating, by a femto access point device comprising a processor, with a network device to facilitate a transfer of file data between the network device and the femto access point device via a transmission link of a broadband network coupled to the femto access point device;
    based on receiving, from the network device, information indicative of a speed of the broadband network that is determined as a function of the transfer, determining, by the femto access point device, performance parameter data indicative of a performance parameter associated with the transmission link; and
    facilitating, by the femto access point device, a transmission of the performance parameter data to an authorized device.

13. The method of claim 12, wherein the determining further comprises determining the performance parameter data based on throughput data indicative of a throughput of the transmission link.

14. The method of claim 13, further comprising:
    performing, by the femto access point device, a network throughput test on the broadband network to facilitate the determining of the throughput data.

15. The method of claim 12, wherein the facilitating the transmission comprises facilitating the transmission in response to determining that the performance parameter data satisfies a defined performance criterion.

16. The method of claim 12, wherein the facilitating the transmission comprises facilitating the transmission via a text message.

17. The method of claim 12 further comprising:
    facilitating, by the femto access point device, a display of the performance parameter data via a graphical interface of the femto access point device.

18. A non-transitory computer-readable medium having instructions stored thereon that, in response to execution, cause a femto access point device comprising a processor to perform operations, comprising:
    facilitating a transfer of file data between the femto access point device and a network device via a transmission link that couples the femto access point device with a broadband network;
    receiving, from the network device, information indicative of a speed of the broadband network that is determined as a function of the transfer; and
    directing, to an authorized device, performance parameter data indicative of a performance parameter associated with the transmission link that is determined based on the information.

19. The non-transitory computer-readable medium of claim 18, wherein the information comprises speed data indicative of a download speed of the broadband network associated with the transfer of the file data from the network device to the femto access point device.

20. The non-transitory computer-readable medium of claim 18, wherein the information comprises speed data indicative of an upload speed of the broadband network associated with the transfer of the file data from the femto access point device to the network device.

* * * * *